US011863628B2

(12) United States Patent
Bertz et al.

(10) Patent No.: US 11,863,628 B2
(45) Date of Patent: Jan. 2, 2024

(54) ADAPTIVE MOBILE COMMUNICATION DEVICE

(71) Applicant: T-Mobile Innovations LLC, Overland Park, KS (US)

(72) Inventors: Lyle T. Bertz, Lee's Summit, MO (US); Galip Murat Karabulut, Vienna, VA (US); Joao Teixeira, Shawnee, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/085,492

(22) Filed: Dec. 20, 2022

(65) Prior Publication Data

US 2023/0132316 A1 Apr. 27, 2023

Related U.S. Application Data

(62) Division of application No. 17/373,221, filed on Jul. 12, 2021, now Pat. No. 11,570,253, which is a
(Continued)

(51) Int. Cl.
*H04L 67/125* (2022.01)
*H04W 12/02* (2009.01)
(Continued)

(52) U.S. Cl.
CPC .......... *H04L 67/125* (2013.01); *G06F 21/629* (2013.01); *G06F 21/6218* (2013.01);
(Continued)

(58) Field of Classification Search
CPC ....... H04L 67/125; H04L 63/10; H04L 67/12; H04L 67/51; H04L 63/105; H04L 67/303;
(Continued)

(56) References Cited

U.S. PATENT DOCUMENTS 6,496,927 B1 * 12/2002 McGrane ........... H04N 21/4363
713/1
6,563,430 B1 * 5/2003 Kemink ........... H04N 21/42202
340/8.1
(Continued)

*Primary Examiner* — Ramy M Osman

(57) ABSTRACT

A method of providing a user interface on a mobile communication device to control smart devices in an environment. The method comprises discovering a plurality of smart devices in an environment by a client application executing on a mobile communication device by initiating wireless communication between the mobile communication device and the plurality of smart devices, wherein the client application learns an electronic model identity of each of the discovered smart devices, communicating with a data store by the client application to look-up control interfaces of the discovered smart devices based on the electronic model identities of the smart devices, looking-up predefined environmental preferences associated with the mobile communication device in the data store by the client application, transmitting control commands by the client application to the plurality of smart devices based in part on the looked-up predefined environmental preferences.

18 Claims, 11 Drawing Sheets

Related U.S. Application Data division of application No. 16/689,077, filed on Nov. 20, 2019, now Pat. No. 11,089,109.

(51) Int. Cl.
*G06F 21/62* (2013.01)
*H04W 12/08* (2021.01)
*H04L 67/12* (2022.01)
*H04L 9/40* (2022.01)
*H04L 67/51* (2022.01)

(52) U.S. Cl.
CPC .............. *H04L 63/10* (2013.01); *H04L 67/12* (2013.01); *H04L 67/51* (2022.05); *H04W 12/02* (2013.01); *H04W 12/08* (2013.01)

(58) Field of Classification Search
CPC .. G06F 21/6218; G06F 21/629; G06F 3/0481; G06F 3/0488; G06F 21/82; H04W 12/02; H04W 12/08; H04W 8/005; H04M 1/72412; H04M 1/72448; H04M 1/72415
See application file for complete search history.

(56) References Cited

U.S. PATENT DOCUMENTS

| | | | |
|---|---|---|---|
| 11,089,109 B1* | 8/2021 | Bertz | H04L 67/12 |
| 11,570,253 B1* | 1/2023 | Bertz | H04L 67/12 |
| 2005/0038875 A1* | 2/2005 | Park | H04L 12/2818 |
| | | | 709/219 |
| 2010/0011304 A1* | 1/2010 | Van Os | H04L 67/52 |
| | | | 715/762 |
| 2013/0024508 A1* | 1/2013 | Sathish | H04L 67/306 |
| | | | 709/204 |
| 2013/0267383 A1* | 10/2013 | Watterson | A63B 22/0242 |
| | | | 482/4 |
| 2014/0237376 A1* | 8/2014 | Cassano | G06F 9/451 |
| | | | 715/744 |
| 2017/0090437 A1* | 3/2017 | Veeramani | H04W 4/80 |
| 2017/0357408 A1* | 12/2017 | Anglin | H04W 4/029 |
| 2018/0018081 A1* | 1/2018 | Dattilo-Green | H04L 67/12 |
| 2018/0034914 A1* | 2/2018 | Christopher | H04L 69/18 |
| 2018/0234519 A1* | 8/2018 | Boyapalle | H04L 67/06 |
| 2020/0169427 A1* | 5/2020 | Wu | H04L 67/125 |
| 2023/0132316 A1* | 4/2023 | Bertz | H04M 1/72415 |
| | | | 709/229 |

* cited by examiner

ADAPTIVE MOBILE COMMUNICATION DEVICE

CROSS-REFERENCE TO RELATED APPLICATIONS

This application is a divisional of and claims priority under 35 U.S.C. § 120 to U.S. patent application Ser. No. 17/373,221, filed on Jul. 12, 2022, entitled "Adaptive Mobile Communication Device," and later amended to "A Method of Adapting a User Interface on a Mobile Communication Device based on Different Environments," by Lyle T. Bertz, et al., which is a divisional of and claims priority under 35 U.S.C. § 120 to U.S. patent application Ser. No. 16/689,077, filed on Nov. 20, 2019, entitled "Adaptive Mobile Communication Device" and later amended to "Smart Device Management via a Mobile Communication Device Based on Privacy Preferences," by Lyle T. Bertz, et al., now U.S. Pat. No. 11,089,109 issued Aug. 10, 2021, all of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

People travel through many different environments. They may be in a home environment, in a work environment, in an airport boarding area, in a hotel room, and other environments. A person may interact with each of these different environments to use facilities in these environments—to operate the lights, to operate the television, to set temperature controls. Different environments may have different control interfaces and different control features.

SUMMARY

In an embodiment, a method of providing a user interface on a mobile communication device to control smart devices in an environment is disclosed. The method comprises discovering a plurality of smart devices in an environment by a client application executing on a mobile communication device by initiating wireless communication between the mobile communication device and the plurality of smart devices, wherein the client application learns an electronic model identity of each of the discovered smart devices and communicating with a data store by the client application to look-up control interfaces of the discovered smart devices based on the electronic model identities of the smart devices. The method further comprises looking-up predefined environmental preferences associated with the mobile communication device in the data store by the client application, transmitting control commands by the client application to the plurality of smart devices based in part on the looked-up predefined environmental preferences, and receiving a message by the client application from at least one of the plurality of smart devices requesting definition of an undefined environmental preference. The method further comprises presenting a dialog box by the client application on the mobile communication device, where the dialog box prompts a user to input a preference for the undefined environmental preference, receiving an input defining the undefined environmental preference, transmitting the input defining the undefined environmental preference by the client application to the at least one of the plurality of smart devices, and transmitting the input defining the undefined environmental preference by the client application to the data store, wherein the predefined environmental preferences associated with the mobile communication device stored in the data store are extended.

In another embodiment, a method of adapting an environment by sharing environmental preferences with smart devices in the environment based on privacy preferences is disclosed. The method comprises discovering a first plurality of smart devices in a first environment by a client application executing on a mobile communication device by initiating wireless communication between the mobile communication device and the first plurality of smart devices, wherein the client application learns an electronic model identity of each of the discovered first plurality of smart devices and determining by the client application a first security category of the first environment. The method further comprises communicating with a data store by the client application to look-up control interfaces of the discovered first plurality of smart devices based on the electronic model identities of the first plurality of smart devices, looking-up a first plurality of predefined environmental preferences associated with the mobile communication device in the data store by the client application based on the identities of the first plurality of smart devices and based on the first security category, and transmitting control commands by the client application to the first plurality of smart devices based on the first plurality of predefined environmental preferences. The method further comprises discovering a second plurality of smart devices in a second environment by the client application by initiating wireless communication between the mobile communication device and the second plurality of smart devices, wherein the client application learns an electronic model identity of each of the discovered second plurality of smart devices and determining by the client application a second security category of the second environment, wherein the second security category is different from the first security category. The method further comprises communicating with the data store by the client application to look-up control interfaces of the discovered second plurality of smart devices based on the electronic model identities of the second plurality of smart devices, looking-up a second plurality of predefined environmental preferences associated with the mobile communication device in the data store by the client application based on the identifies of the second plurality of smart devices and based on the second security category, wherein the second plurality of predefined environmental preferences are restricted because the second security category is less private than the first security category, and transmitting control commands by the client application to the second plurality of smart devices based on the second plurality of predefined environmental preferences.

In yet another embodiment, a method of adapting a user interface on a mobile communication device based on different environments is disclosed. The method comprises determining by a client application executing on a mobile communication device that the mobile communication device is in a first environment based on identities of a first plurality of smart electronic devices in wireless communication with the mobile communication device while in the first environment, selecting a first plurality of application icons by the client application based on predefined preferences associated with the first environment, and causing the mobile communication device to present the selected first plurality of application icons on a home screen of a display of the mobile communication device. The method further comprises determining by the client application that the mobile communication device is in a second environment based on identities of a second plurality of smart electronic devices in wireless communication with the mobile communication device while in the second environment, selecting a second plurality of application icons by the client application based on predefined preferences associated with the second environment, wherein at least one of the second plurality of application icons is not included in the first plurality of application icons, and causing the mobile communication device to present the selected second plurality of application icons on a home screen of a display of the mobile communication device, wherein the user interface of the mobile communication device is adapted based on the change from the first environment to the second environment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
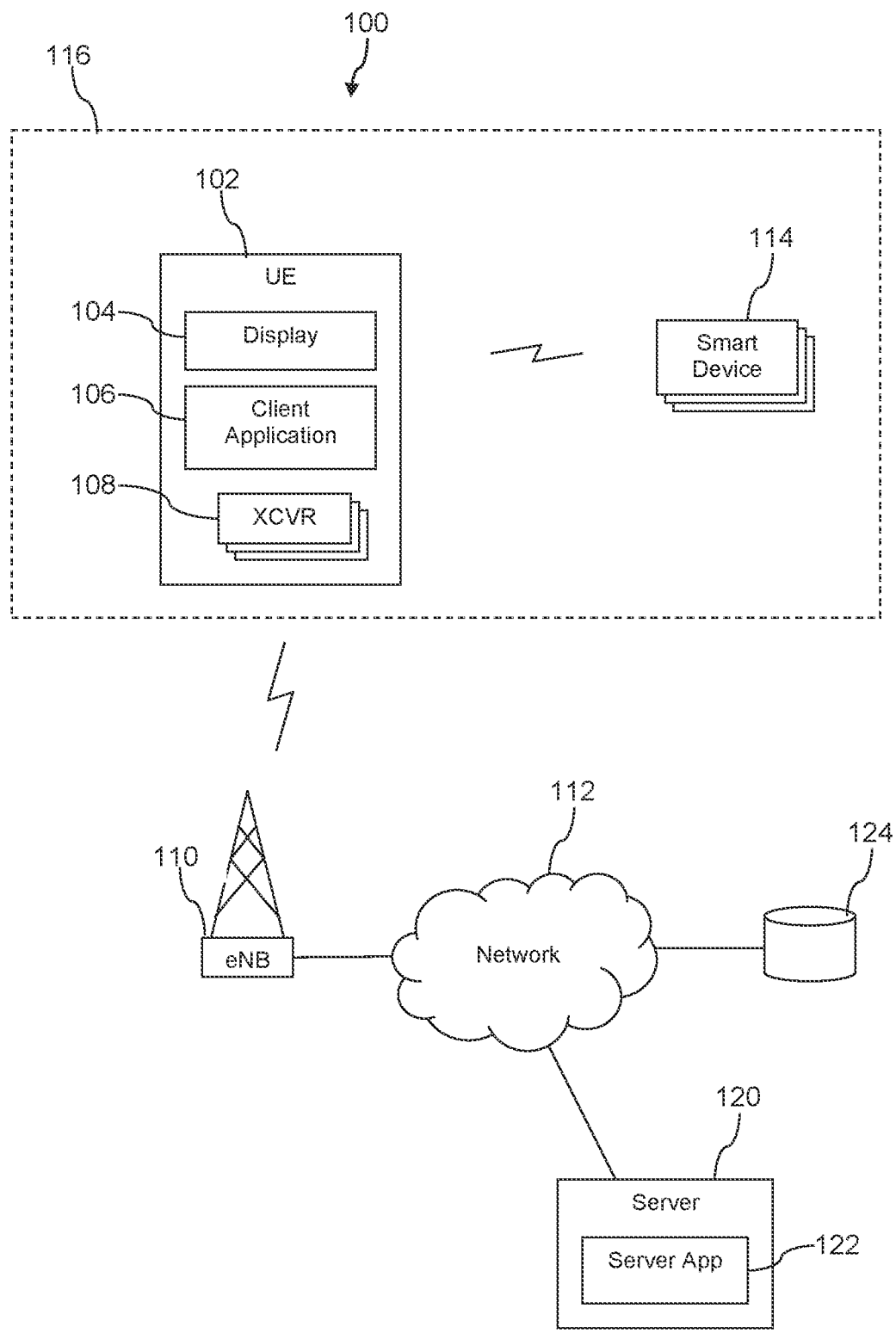
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Increasingly we encounter new technology as we pass through different environments. When we travel we may encounter smart control devices in our hotel room with a WiFi or Bluetooth interface that we can access from our mobile communication devices to operate features in the environment, for example turn lights off and on and control the room temperature. If we have preferred control signals we program for a first environment we may wish to be able to use these control signals in a second environment. Different smart control devices, however, may have different interfaces and different control mechanisms. The present disclosure teaches a client application that executes on a mobile communication device that discovers smart control devices in environments we enter and programs them with our predefined preferences.

Where new configuration settings are encountered for the first time, for example when first interacting with a new kind of smart control, the client application may pop-up a dialog box on the display of our mobile communication device and leads us through the process of defining and sharing our preferences with reference to the new smart control. The client application captures the newly defined preference and sends a message back to a data store that indicates the identity of the smart control (e.g., a make and model), information about an application programming interface (API) of the smart control, a location where the smart control is installed, and the newly defined preference associated with the specific user. The newly defined preference is added to a profile storing other control preferences of the user in the data store and/or on the mobile communication device.

The information about the smart control make and model, the information about the API of the smart control, and the location of the smart control may be stored by the data store for use by other client applications on other mobile communication devices. For example, the client application of another mobile communication device associated with a different user who is scheduled to check-in to the same hotel that has the new smart control may ask the user his or her preference for the smart control in advance of their check-in at the hotel. For example, the client application of another mobile communication device associated with a different user who is in an environment that features a smart control having the same make and model encountered by the first mobile communication device. The preference of the first user for commanding the smart control may be made a default value by the data store, such that when different users encounter the smart control they are able to start with the control configuration of the first user as a default preference value. As additional users express preferences for interacting with the same make and model of control, an application executing on a server computer in a wireless communication service provider network may determine an average or common user preference for controlling the same make and model of smart control and make this common preference a default value for the interaction preference. In an embodiment, the application may prompt other users via the client application executing on their mobile devices to define their preference for interacting with the subject smart control, offering the most common user defined preference as an initial default value for that user. When the user provides their preference or accepts the default value, this may be stored into the preference of the user. In this way, as new smart controls are first introduced, the effort of defining user preferences for this new smart control may be eased and made more convenient (e.g., the user can select the default or is presented with a list of possible alternative interaction values).

In an embodiment, the client application can identify an environment based on the identities of the smart devices located in that environment. For example, the client application may be able to identify a work environment, a hotel environment, an own home environment, a friend's home environment, and a restaurant environment based on identities of specific smart controls in those environments. After identifying the environments, the client application may command the mobile communication device to adapt a user interface to be suitable for use in the present environment. For example, the application icons may be moved from a secondary screen to a home screen of the mobile device when entering the work environment. For instance, the application icons on a third screen may be moved to the home screen when entering the friend's home environment.

In an embodiment, when the mobile communication device is in different environments, the client application may share different preferences with the environment, for example with smart devices in the environment. In some cases, the client application may prevent disclosing some preferences in environments deemed by the user to be public environments while the client application may disclose those same preferences in environments deemed by the user to be private environments. For example, the user of the mobile communication device may configure the client application to associate an airport boarding area, a hotel lobby, a museum, and a restaurant as public security category environments and to associate a hotel room, a friend's home, and work as private security category environments.

An interface in the client application that executes on the mobile communication device allows it to interact with the data store and the server application, for example an API extended by the data store and/or the server application. The client application may both request to download a copy of the user's profile from the data store and/or the server application and update the user's profile as new controls are experienced and interaction preferences defined. Likewise, the API may promote pushing information to client applications on other mobile communication devices, for example pushing out a default interaction preference for a new control and/or pushing out a query to the user to define a preference for interacting with the control.

The server application can protect the identity of specific users and share the information gleaned from one or more users (e.g., in defining default values for control interaction preferences) without in anyway providing a way for entities outside the service provider's system for linking specific users to specific preferences, thereby maintaining these preferences confidential and secure. The server application can separate information such as location and/or names of hotels from the information that is shared with other devices, such as default control interaction preferences, thereby maintaining locations confidential. The server application may selectively prompt users to define control interaction preferences for users who it determines travel frequently to hotels that feature smart control devices, without in any way revealing this information about those users. This solution promotes integration of new smart control interfaces into profiles and ease of user interaction with evolving smart control environments while maintaining the privacy of users.

Turning now to FIG. 1, a communication system 100 is described. In an embodiment, the system 100 comprises a mobile communication device (user equipment—UE) 102 comprising a display 104, a client application, and one or more radio transceivers 108. The system 100 comprises a cell site 110 that may provide a wireless communication link to the UE 102 and communicatively couple the UE 102 to a network 112. The cell site 110 may provide a wireless link to the UE 102 according to a 5G, a long term evolution (LTE), a code division multiple access (CDMA), and/or a global system for mobile communications (GSM) telecommunication protocol. The network 112 comprises one or more public networks, one or more private networks, or a combination thereof. The system 100 comprises one or more smart devices 114, for example smart controls. The system 100 comprises a server computer 120, a server application 122 executing on the server 120, and a data store 124. Computers are discussed further herein after.

The UE 102 may be a mobile phone, a smart phone, a personal digital assistant (PDA), a wearable computer, a headset computer, a laptop computer, a notebook computer, or a tablet computer. The smart device 114 may be an electronic and/or electromechanical device that incorporates a processor and a wireless transceiver able to communicate wirelessly with one of the transceivers 108 of the UE 102, for example a smart light switch, a smart temperature controller, a smart thermostat, a smart door lock. The smart device 114 may be a flat screen television, a gaming system, or an electronic assistant that incorporates a processor and a wireless transceiver able to communicate wirelessly with one of the transceivers 108 of the UE 102. One or more of the smart devices 114 may be referred to as smart controls in some contexts herein.

The UE 102 and the smart devices 114 may be located in an environment 116, for example a hotel room, a hotel lobby, a work office, a personal residence, a friend's residence, a boarding area at an airport, a restaurant, a sports venue, or other venue. While a single UE 102, a single cell site 110, and a single environment 116 are depicted in FIG. 1, it is understood that the system 100 comprises many UEs 102, many cell sites 110, and many environments 110.

In an embodiment, the client application 106 provides a variety of functions for discovering smart devices 114, identifying the environment 116, and providing user preferences to the smart devices 114. The client application 106 may communicate with a smart device 114 via one of the transceivers 108. The client application 106 may communicate with a first smart device 114 via a first transceiver 108 and communicate with a second smart device 114 via a second transceiver 108. The client application 106 may learn the capabilities and/or application programming interface (API) provided by the smart devices 114 through a process of discovery.

The client application 106 may provide a profile of preferences defined by a user of the UE 102 to the smart devices 114. For example, the profile may identify an initial hotel room temperature preference of the user. For example, a first user may prefer an initial temperature of 60 degrees to 65 degrees, while a second user may prefer an initial temperature of 75 degrees to 80 degrees. The profile may identify a number of extra towels wanted for a hotel room, and an electronic assistant in the room may act on this item of profile information by informing the front desk of the hotel to send up extra towels. The profile may identify a set of verbal commands for operating smart controls in the environment 116. For example, the verbal commands may comprise a specific verbal signature of the user and be distinct from the verbal signature of a different person. The profile may identify a preferred language or preferred accent or dialect. For example, a French speaking traveler may prefer to interact with the electronic assistant in the room in his or her native French. For example, an Australian traveler may prefer to interact with the electronic assistant in the room in an Australian accented form of English; a British traveler may prefer to interact with the electronic assistant in the room in a British accented form of English. The profile may identify a preferred wake-up time that the electronic assistant may use to prompt the traveler to wake up, for example by playing audio in a hotel room.

The profile of the user of the UE 102 (and the profiles of other users of other UEs 102) may be stored in the data store 124, and the client application 106 may request the profile or portions of the profile when first entering an environment 116 and first discovering the smart devices 114 of the environment. Alternatively, the profile may be stored locally in the UE 102 but be copied in the data store 124 both as a backup to the local copy and for use by the server application 122 as described further hereinafter.

One or more of the smart devices 114 may provide an API related to a yet undefined preference of the user. In this case, the client application 106 may pop-up a dialog box on the display 104 prompting the user to define his or her preference on the subject. The dialog box may provide the user with a "don't care" input selection. The dialog box may provide the user with a "not now" input selection, whereby the user indicates they do not wish to be bothered with defining preferences at that time. The dialog box may provide a series of alternative preference selections. When a user inputs a new preference, the client application 106 may store the new preference in the locally stored profile and copy the new preference back to the data store 124.

The client application 106 may provide information back to the server application 122 and/or to the data store 124 about the API of one or more of the smart devices 114. If the API offers methods and parameters that the client application 106 is unfamiliar with, it may be valuable to share this new information back to the server application 122, and the server application 122 may share this new information among other UEs 102. For example, the server application 122 may inform other UEs 102 of the new API methods and/or parameters, so the client applications 106 on these other UEs 102 may be more prepared to interact with similar smart devices 114 that they may encounter in the future.

The client application 106 may transmit information about an unfamiliar API of a smart device 114 in a message that further comprises information about a make and model of the smart device 114. The server application 122 may store this API information in the data store 124 associated with or indexed by the make and model of the smart device 114. When a client application 106 on another UE 102 discovers an unfamiliar smart device 114, it may request information on the API of the subject smart device 114 from the server application 122. The server application 122 may use the identity of the make and model of the smart device 114 to look up the API stored in the data store 124 and then return this API information to the requesting client application 106. The client application 106 may then communicate with the smart device 114 based on the API information. This boot strapping of the client application 106 to obtain the API of the smart device 114 may be considered to be part of the discovery activity. When no API for a smart device 114 is stored in the data store 124, the client application 106 may conduct a more time consuming learning dialog with the smart device 114 to learn the particulars of its API. Thus, sharing the information of a new API back to the server application 122 and to the data store 124 can significantly improve the operating efficiency of other UEs 102 which may thereby obviate the time consuming learning dialog by simply requesting the server application 122 to look-up and to share the previously stored API.

In an embodiment, the user of the UE 102 may wish that his or her profile not be shared in all environments 116 or may wish to share a restricted portion of the profile in some environments 116. The client application 106 may be configured to associate different environments 116 to different environment security categories. For example, the client application 106 may segregate environments 116 into private environments and public environments. Alternatively, the client application 106 may segregate environments 116 into private environments, exclusive environments, and public environments, where exclusive environments are intermediate in their security. The user may configure the client application 106 to associate hotel rooms, private work offices, personal residence, and residences of friends as private environments; to associate hotel lobbies, office building lobbies, and schools as exclusive environments; and to associate government offices, airport boarding areas, and restaurants as public environments. The user may further configure the client application 106 by defining what profile parameters to share in each of these different environment security categories.

In an embodiment, the client application 106 may identify an environment 116 by the identities of the smart devices 114 located in the environment 116. It may be the case that a user repeatedly enters the same environments. The user may enter a same work environment 116 five days per week. The user may enter the same personal residence environment 116 repeatedly. The user may enter the same airport boarding area environment 116 repeatedly. In this case, the client application 106 can identify the specific environment 116. The user can configure the client application 106 to associate a given environment with one of the environment security categories. Alternatively, the client application 106 may infer the environment security categories based on the smart devices 114 identified in the environment 116 and based on a physical location of the UE 102. In an embodiment, one or more smart device 114 in the environment 116 may inform the client application 106 what the environment security category is of the environment 116.

Figure 2:
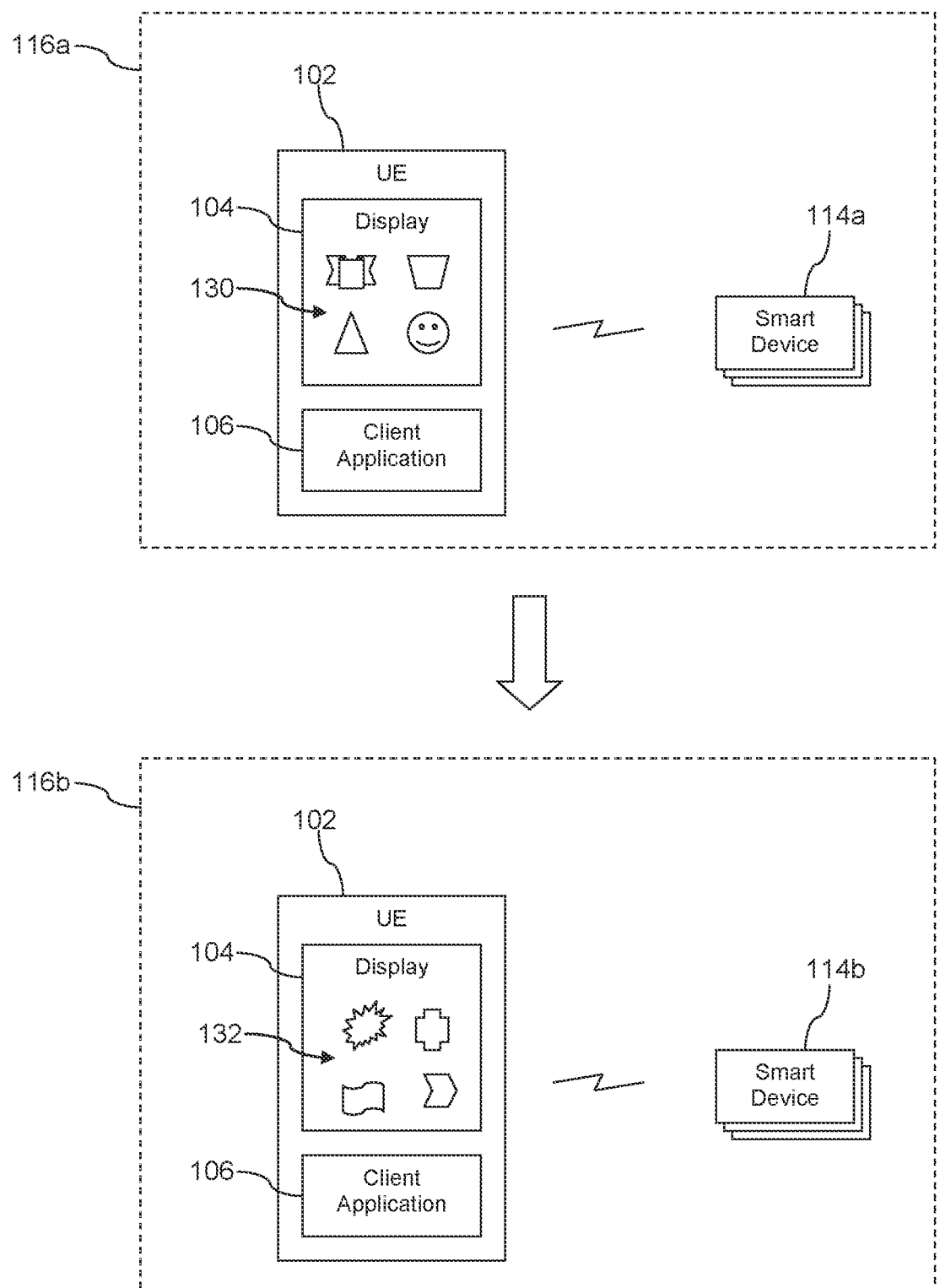
FIG. 2 is an illustration of a mobile communication device located in two different environments at two different times according to an embodiment of the disclosure.

Turning now to FIG. 2, a UE 102 moving from a first environment 116a to a second environment 116b is described. In the first environment 116a, the UE 102 presents a first set of application icons 130 on a home screen of the display 104. When the UE 102 moves from the first environment 116a to the second environment 116b, the UE 102 presents a second set of application icons 132 on a home screen of the display 104. The client application 106 is able to identify an environment 116 and adapt the user interface of the UE 102 by causing a selected plurality of application icons to be presented on the home screen of the display 104 based on the environment 116 the UE 102 is currently in. The client application 106 determines that it is in the first environment 116a based on detecting the presence of smart devices 114a that it associates with the first environment 116a; and the client application 106 determines that it is in the second environment 116b based on detecting the presence of smart devices 114b that it associates with the second environment 116b.

The user of the UE 102 may interact with different applications while located in different environments. For example, the user may interact with a calendar application and email application on the UE 102 while in his or her work office environment 116 and interact with a gaming application and a social networking application on the UE 102 while in his or her personal residence environment 116. In an embodiment, the user of the UE 102 may invoke a function of the client application 106 that promotes defining a distribution of application icons 130 to a home screen, a second screen, and/or a third screen of the display 104 in the first environment 116a and a distinct distribution of application icons 132 to the home screen, the second screen, and/or the third screen of the display 104 in the second environment 116b. By adapting placement of application icons on screens of the UE 102, the client application 106 may improve the user experience of the UE 102.

Figure 3A:
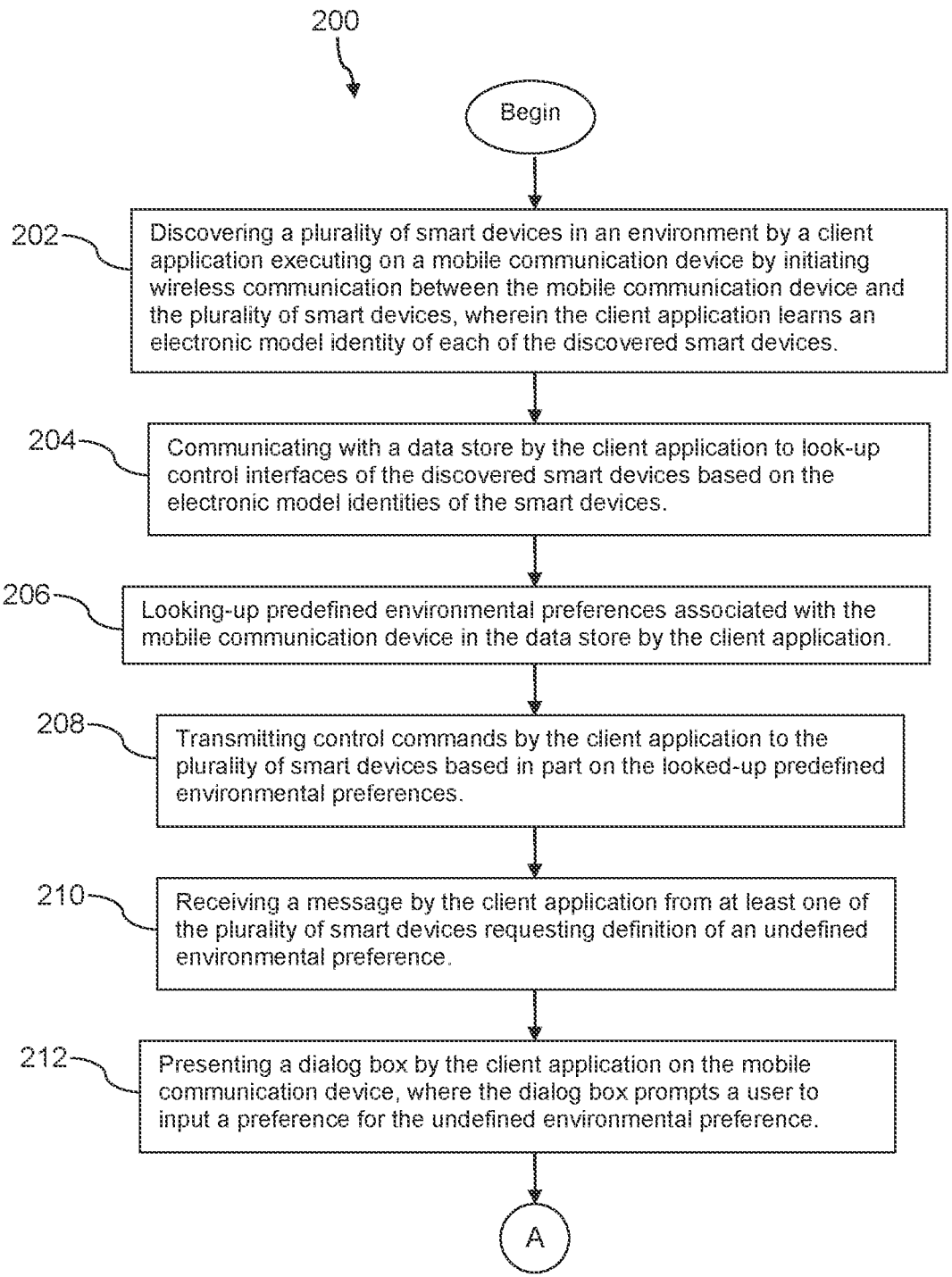
FIG. 3A and FIG. 3B are a flow chart of a method according to an embodiment of the disclosure.
Figure 3B:
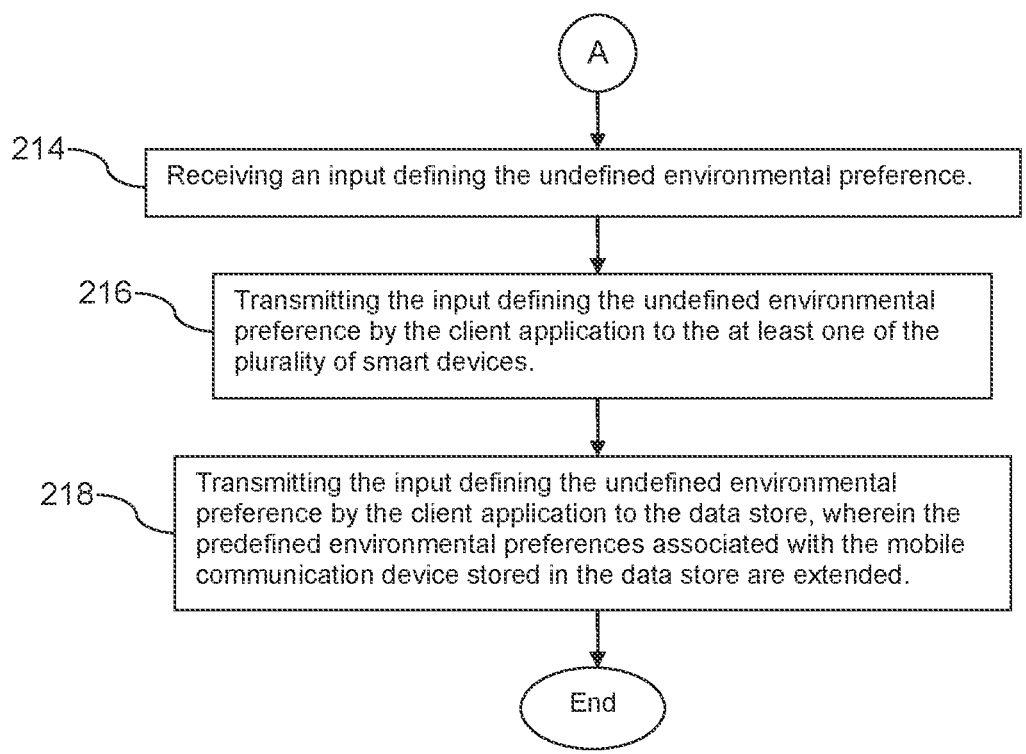

Turning now to FIG. 3A and FIG. 3B, a method 200 is described. In an embodiment, the method 200 is a method of providing a user interface on a mobile communication device to control smart devices in an environment. At block 202, the method 200 comprises discovering a plurality of smart devices in an environment by a client application executing on a mobile communication device by initiating wireless communication between the mobile communication device and the plurality of smart devices, wherein the client application learns an electronic model identity of each of the discovered smart devices. The mobile communication device may communicate with the smart devices using a wireless communication link, for example a WiFi communication link, a Bluetooth communication link, a near-field communication link, or another wireless communication link.

At block 204, the method 200 comprises communicating with a data store by the client application to look-up control interfaces of the discovered smart devices based on the electronic model identities of the smart devices. Looking-up control interfaces may comprise obtaining information about application programming interfaces (APIs) of the smart devices. At block 206, the method 200 comprises looking-up predefined environmental preferences associated with the mobile communication device in the data store by the client application. At block 208, the method 200 comprises transmitting control commands by the client application to the plurality of smart devices based in part on the looked-up predefined environmental preferences. The client application may further transmit some of the predefined environmental preferences to one or more of the smart devices. For example, the client application may transmit a language preference and/or an accent or dialect preference to a smart device. The client application may transmit a room temperature control preference to a smart device. The client application may transmit a wake-up time preference to a smart device, for example to an electronic assistant in the environment.

At block 210, the method 200 comprises receiving a message by the client application from at least one of the plurality of smart devices requesting definition of an undefined environmental preference. In an embodiment, the smart device may further transmit information about an API of the smart device to the client application. At block 212, the method 200 comprises presenting a dialog box by the client application on the mobile communication device, where the dialog box prompts a user to input a preference for the undefined environmental preference. At block 214, the method 200 comprises receiving an input defining the undefined environmental preference.

At block 216, the method 200 comprises transmitting the input defining the undefined environmental preference by the client application to at least one of the plurality of smart devices. At block 218, the method 200 comprises transmitting the input defining the undefined environmental preference by the client application to the data store, wherein the predefined environmental preferences associated with the mobile communication device stored in the data store are extended. In an embodiment, the client application may further transmit information about the API of the smart device to the data store, for example where the transmitted information is associated to a make and model for the smart device.

Figure 4A:
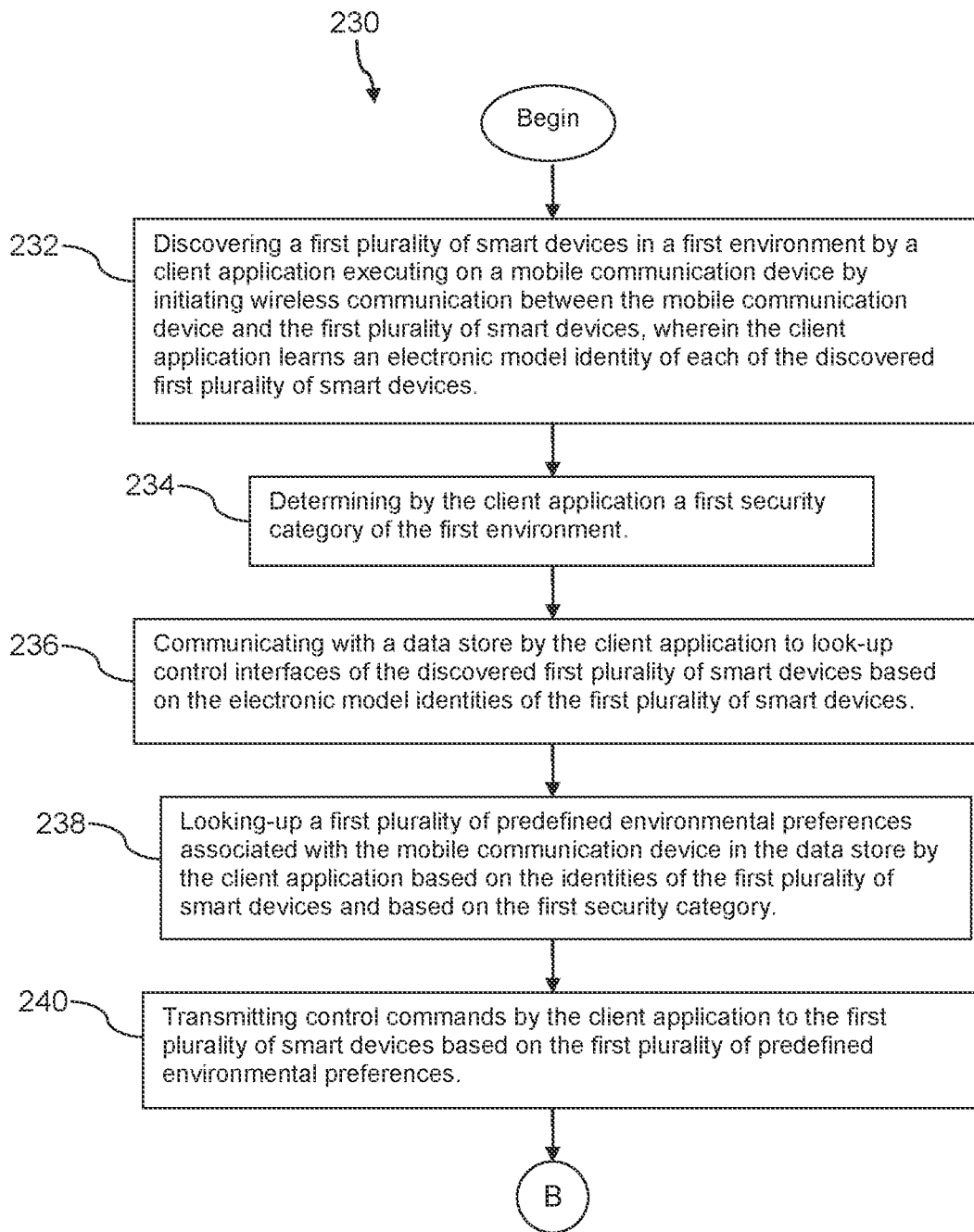
FIG. 4A and FIG. 4B are a flow chart of another method according to an embodiment of the disclosure.
Figure 4B:
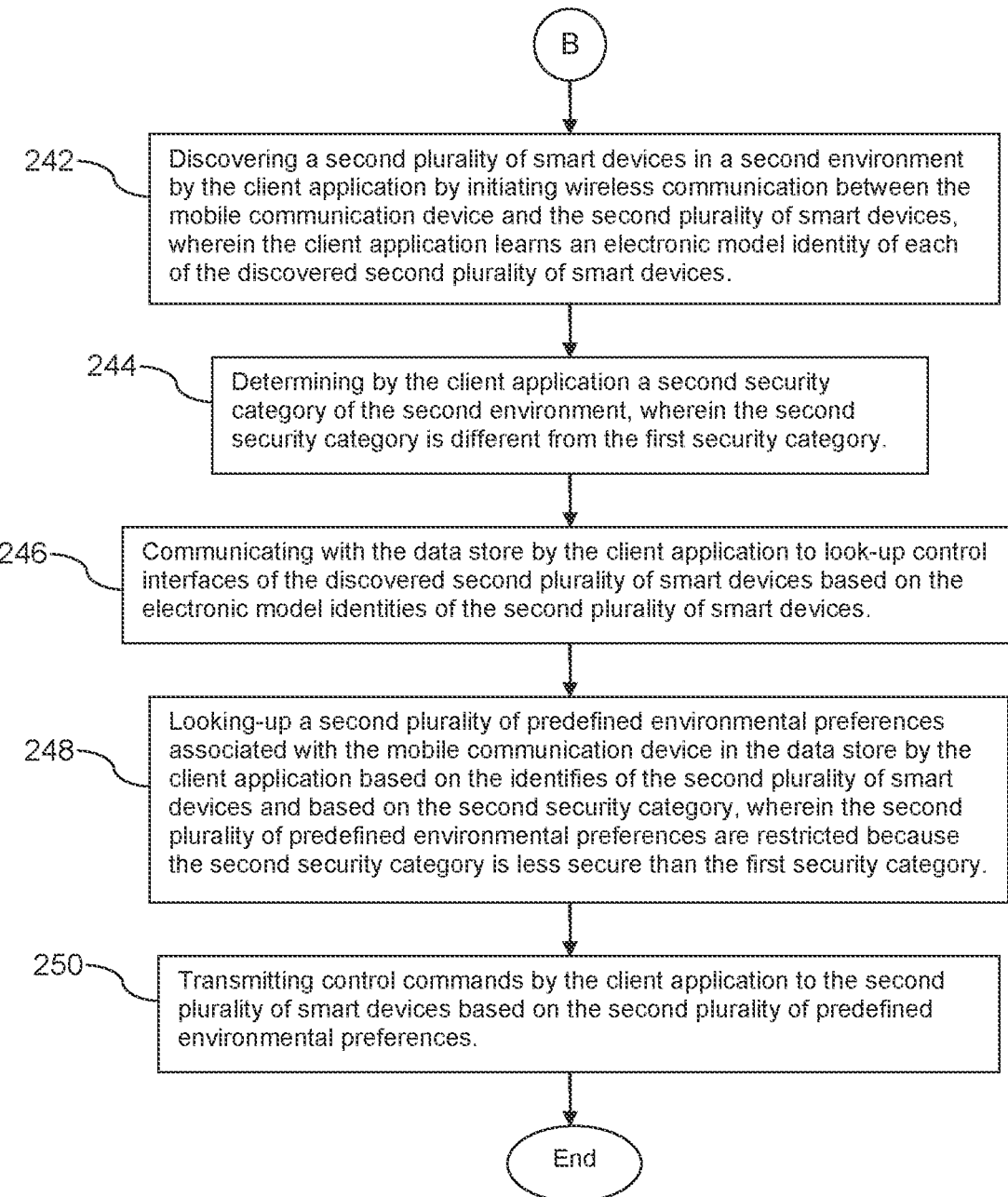

Turning now to FIG. 4A and FIG. 4B, a method 230 is described. In an embodiment, the method 230 is a method of adapting an environment by sharing environmental preferences with smart devices in the environment based on privacy preferences. At block 232, the method 230 comprises discovering a first plurality of smart devices in a first environment by a client application executing on a mobile communication device by initiating wireless communication between the mobile communication device and the first plurality of smart devices, wherein the client application learns an electronic model identity of each of the discovered first plurality of smart devices.

At block 234, the method 230 comprises determining by the client application a first security category of the first environment. The client application may determine the first security category based on the types of the smart devices present in the first environment. The client application may determine the first security category based on having previously discovered the specific smart devices in the first environment and having had a user of the mobile communication device explicitly provide an input creating the association of the identities of the specific smart devices and the first security category. At block 236, the method 230 comprises communicating with a data store by the client application to look-up control interfaces of the discovered first plurality of smart devices based on the electronic model identities of the first plurality of smart devices.

At block 238, the method 230 comprises looking-up a first plurality of predefined environmental preferences associated with the mobile communication device in the data store by the client application based on the identities of the first plurality of smart devices and based on the first security category. At block 240, the method 230 comprises transmitting control commands by the client application to the first plurality of smart devices based on the first plurality of predefined environmental preferences.

At block 242, the method 230 comprises discovering a second plurality of smart devices in a second environment by the client application by initiating wireless communication between the mobile communication device and the second plurality of smart devices, wherein the client application learns an electronic model identity of each of the discovered second plurality of smart devices. At block 244, the method 230 comprises determining by the client application a second security category of the second environment, wherein the second security category is different from the first security category.

At block 246, the method 230 comprises communicating with the data store by the client application to look-up control interfaces of the discovered second plurality of smart devices based on the electronic model identities of the second plurality of smart devices. At block 248, the method 230 comprises looking-up a second plurality of predefined environmental preferences associated with the mobile communication device in the data store by the client application based on the identifies of the second plurality of smart devices and based on the second security category, wherein the second plurality of predefined environmental preferences are restricted because the second security category is less secure than the first security category. At block 250, the method 230 comprises transmitting control commands by the client application to the second plurality of smart devices based on the second plurality of predefined environmental preferences.

Figure 5:
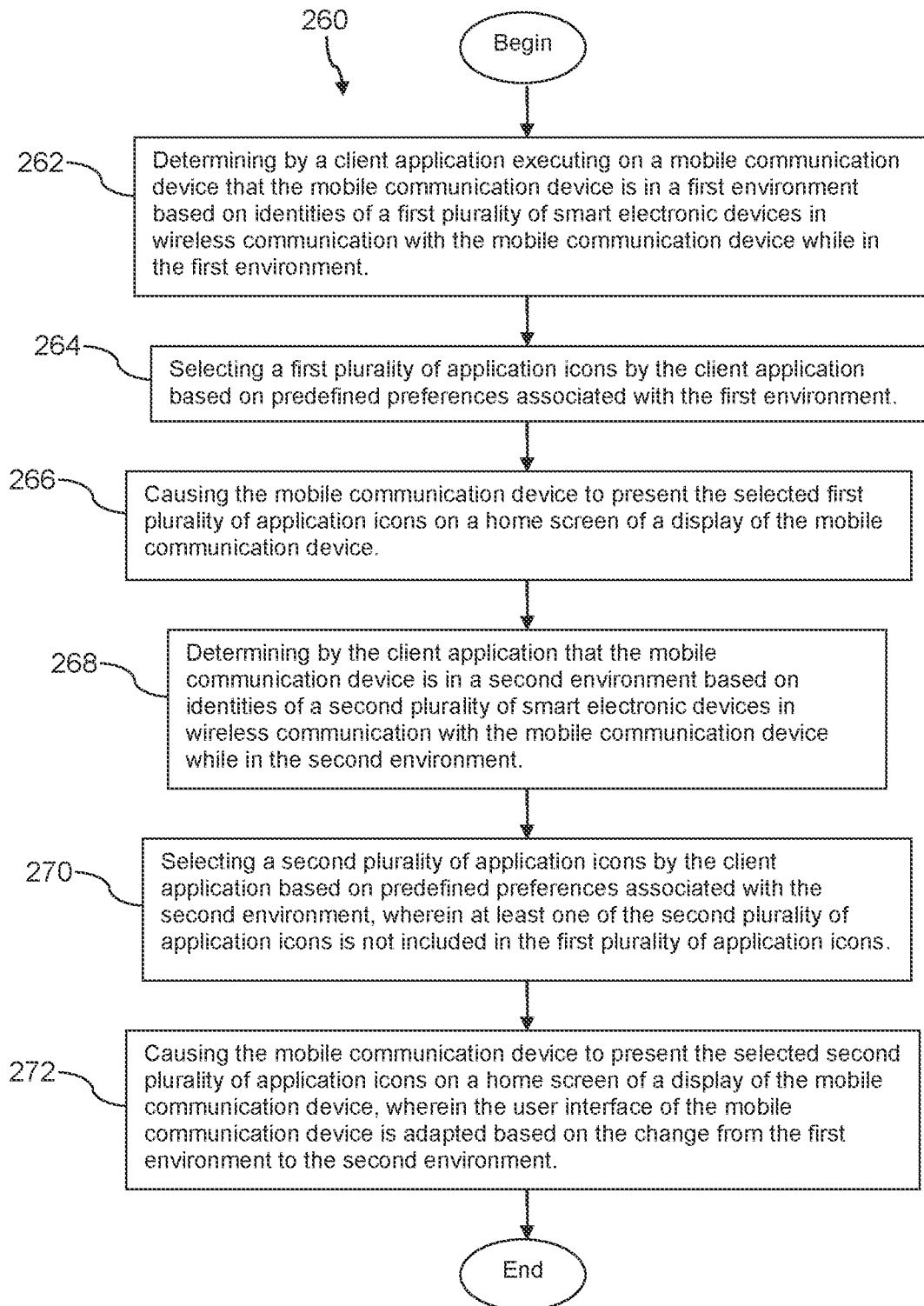
FIG. 5 is a flow chart of yet another method according to an embodiment of the disclosure.

Turning now to FIG. 5, a method 260 is described. In an embodiment, the method 260 is a method of adapting a user interface on a mobile communication device based on different environments. At block 262, the method 260 comprises determining by a client application executing on a mobile communication device that the mobile communication device is in a first environment based on identities of a first plurality of smart electronic devices in wireless communication with the mobile communication device while in the first environment.

At block 264, the method 260 comprises selecting a first plurality of application icons by the client application based on predefined preferences associated with the first environment. At block 266, the method 260 comprises causing the mobile communication device to present the selected first plurality of application icons on a home screen of a display of the mobile communication device.

At block 268, the method 260 comprises determining by the client application that the mobile communication device is in a second environment based on identities of a second plurality of smart electronic devices in wireless communication with the mobile communication device while in the second environment. At block 270, the method 260 comprises selecting a second plurality of application icons by the client application based on predefined preferences associated with the second environment, wherein at least one of the second plurality of application icons is not included in the first plurality of application icons. At block 272, the method 260 comprises causing the mobile communication device to present the selected second plurality of application icons on a home screen of a display of the mobile communication device, wherein the user interface of the mobile communication device is adapted based on the change from the first environment to the second environment.

Figure 6:
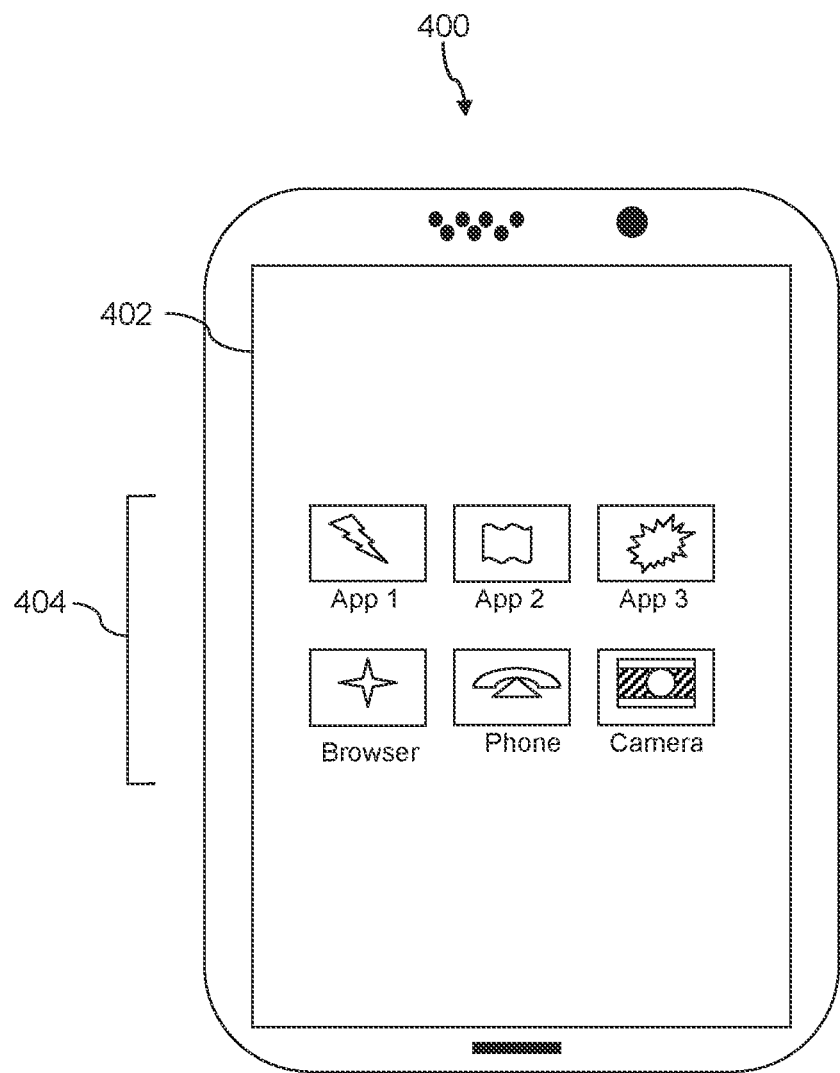
FIG. 6 is an illustration of a handset according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
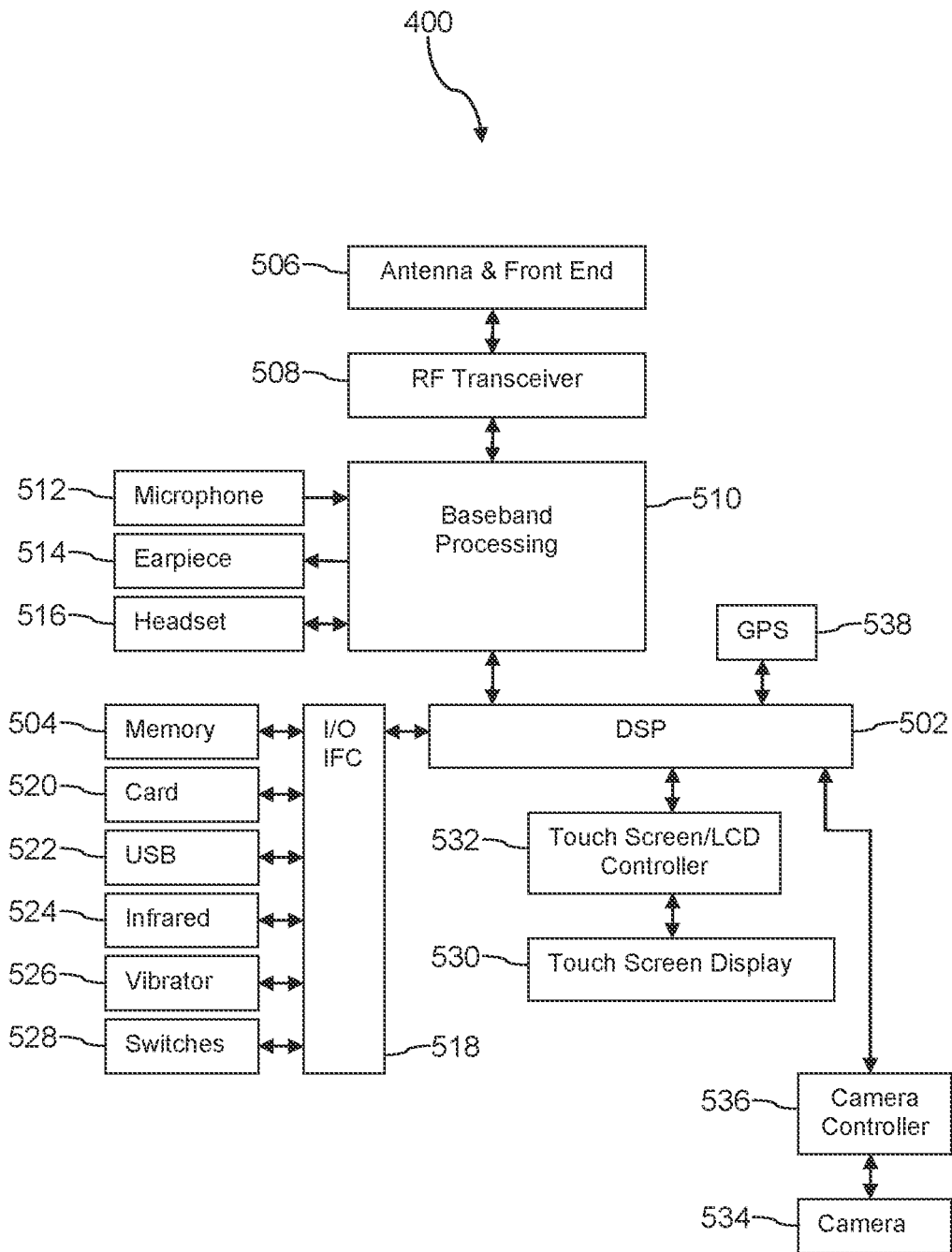
FIG. 7 is a block diagram of a hardware architecture according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
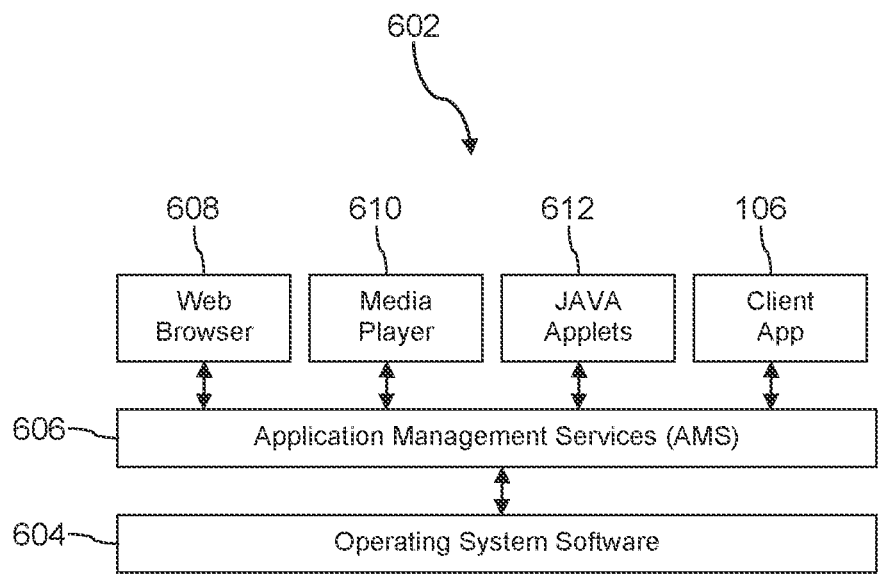
FIG. 8A is a block diagram of a software architecture according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, JAVA applets 612, and the client application 106. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
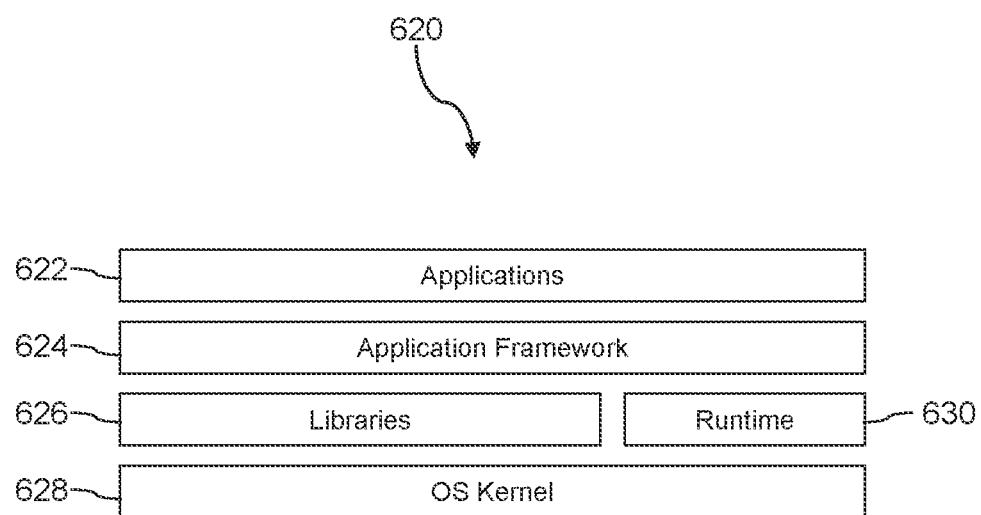
FIG. 8B is a block diagram of another software architecture according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
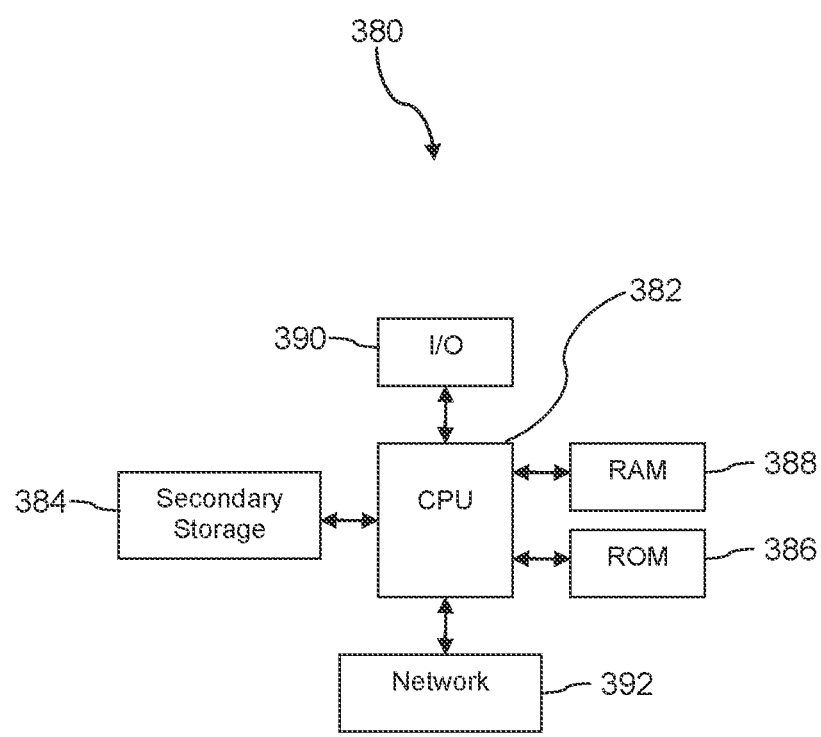
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, (e.g., to configure the CPU 382 to perform the function or functions promoted by the subject application). When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a user interface on a mobile communication device to control smart devices in an environment, comprising:
    discovering a plurality of smart devices in an environment by a client application executing on a mobile communication device by initiating wireless communication between the mobile communication device and the plurality of smart devices, wherein the client application learns an electronic model identity of each of the discovered smart devices;
    communicating with a data store by the client application to look-up control interfaces of the discovered smart devices based on the electronic model identities of the smart devices, wherein looking-up the control interfaces comprises obtaining information about application programming interfaces (APIs) of the plurality of smart devices;
    looking-up predefined environmental preferences associated with the mobile communication device in the data store by the client application;
    transmitting control commands by the client application to the plurality of smart devices based in part on the looked-up predefined environmental preferences;
    receiving a message by the client application from at least one of the plurality of smart devices requesting a definition of an undefined environmental preference;
    presenting a dialog box by the client application on the mobile communication device, where the dialog box prompts a user to input a preference for the undefined environmental preference;
    receiving an input defining the undefined environmental preference;
    transmitting the input defining the undefined environmental preference by the client application to the at least one of the plurality of smart devices; and
    transmitting the input defining the undefined environmental preference, the electronic model identity of the at least one of the plurality of smart devices, the information about the API of the at least one of the plurality of smart devices, and a location where the at least one of the plurality of smart devices is installed by the client application to the data store, wherein the predefined environmental preferences associated with the mobile communication device stored in the data store are extended.

2. The method of claim 1, wherein the mobile communication device is one of a mobile phone, a smart phone, a personal digital assistant (PDA), a wearable computer, a headset computer, a laptop computer, a notebook computer, or a tablet computer.

3. The method of claim 1, wherein the smart devices comprise a light switch, a thermostat, an electronic assistant, a door lock, a television, or a gaming system.

4. The method of claim 1, wherein the mobile communication device communicates with at least one of the smart devices via WiFi wireless communication.

5. The method of claim 1, wherein the mobile communication device communicates with at least one of the smart devices via Bluetooth wireless communication.

6. The method of claim 1, wherein the predefined environment preferences comprise an initial room temperature preference.

7. The method of claim 1, wherein the predefined environmental preferences comprise a definition of a user specific input command for a smart device.

8. The method of claim 1, wherein the input defining the undefined environmental preference is made a default preference value by the data store.

9. The method of claim 8, further comprising:
    looking-up the default preference value in the data store by a different client application on a different mobile communication device associated with a different user who is in an environment that features a smart device having a same make and model as the at least one of the plurality of smart devices encountered by the mobile communication device; and
    transmitting the default preference value by the different client application to the smart device.

10. The method of claim 9, further comprising prompting the different user via the different client application to define their preference for interacting with the smart device, wherein the default preference value is offered to the different user as an initial default value, and wherein the default preference value is transmitted to the smart device in response to the different user accepting the default preference value.

11. A system for providing a user interface on a mobile communication device to control smart devices in an environment, comprising:
    a mobile communication device comprising a non-transitory memory and a processor: and
    a client application stored in the non-transitory memory that, when executed by the processor:
        discovers a plurality of smart devices in an environment by initiating wireless communication between the mobile communication device and the plurality of smart devices, wherein the client application learns an electronic model identity of each of the discovered smart devices, communicates with a data store to look-up control interfaces of the discovered smart devices based on the electronic model identities of the smart devices, wherein looking-up control interfaces comprises obtaining information about application programming interfaces (APIs) of the plurality of smart devices, looks-up predefined environmental preferences associated with the mobile communication device in the data store, transmits control commands to the plurality of smart devices based in part on the looked-up predefined environmental preferences, receives a message from at least one of the plurality of smart devices requesting a definition of an undefined environmental preference, presents a dialog box on the mobile communication device, where the dialog box prompts a user to input a preference for the undefined environmental preference, receives an input defining the undefined environmental preference, transmits the input defining the undefined environmental preference to the at least one of the plurality of smart devices, and transmits the input defining the undefined environmental preference, the electronic model identity of the at least one of the plurality of smart devices, the information about the API of the at least one of the plurality of smart devices, and a location where the at least one of the plurality of smart devices is installed to the data store, wherein the predefined environmental preferences associated with the mobile communication device stored in the data store are extended.

12. The system of claim 11, wherein the mobile communication device is one of a mobile phone, a smart phone, a personal digital assistant (PDA), a wearable computer, a headset computer, a laptop computer, a notebook computer, or a tablet computer.

13. The system of claim 11, wherein the smart devices comprise a light switch, a thermostat, an electronic assistant, a door lock, a television, or a gaming system.

14. The system of claim 11, wherein the mobile communication device communicates with at least one of the smart devices via WiFi wireless communication or Bluetooth wireless communication.

15. The system of claim 11, wherein the predefined environment preferences comprise an initial room temperature preference.

16. The system of claim 11, wherein the predefined environmental preferences comprise a definition of a user specific input command for a smart device.

17. The system of claim 11, wherein the input defining the undefined environmental preference is made a default preference value by the data store.

18. The system of claim 17, further comprising:
a different mobile communication device comprising a non-transitory memory and a processor, wherein the different mobile communication device is associated with a different user who is in an environment that features a smart device having a same make and model as the at least one of the plurality of smart devices encountered by the mobile communication device; and
a client application stored in the non-transitory memory of the different mobile communication device that, when executed by the processor of the different mobile communication device:
looks-up the default preference value in the data store,
prompts the different user to define their preference for interacting with the smart device, and
in response to the different user accepting the default preference value, transmits the default preference value to the smart device.

* * * * *